No. 848,428. PATENTED MAR. 26, 1907.
J. D. BELANGER.
OIL CAKE TRIMMER.
APPLICATION FILED JUNE 2, 1906.
2 SHEETS—SHEET 1.
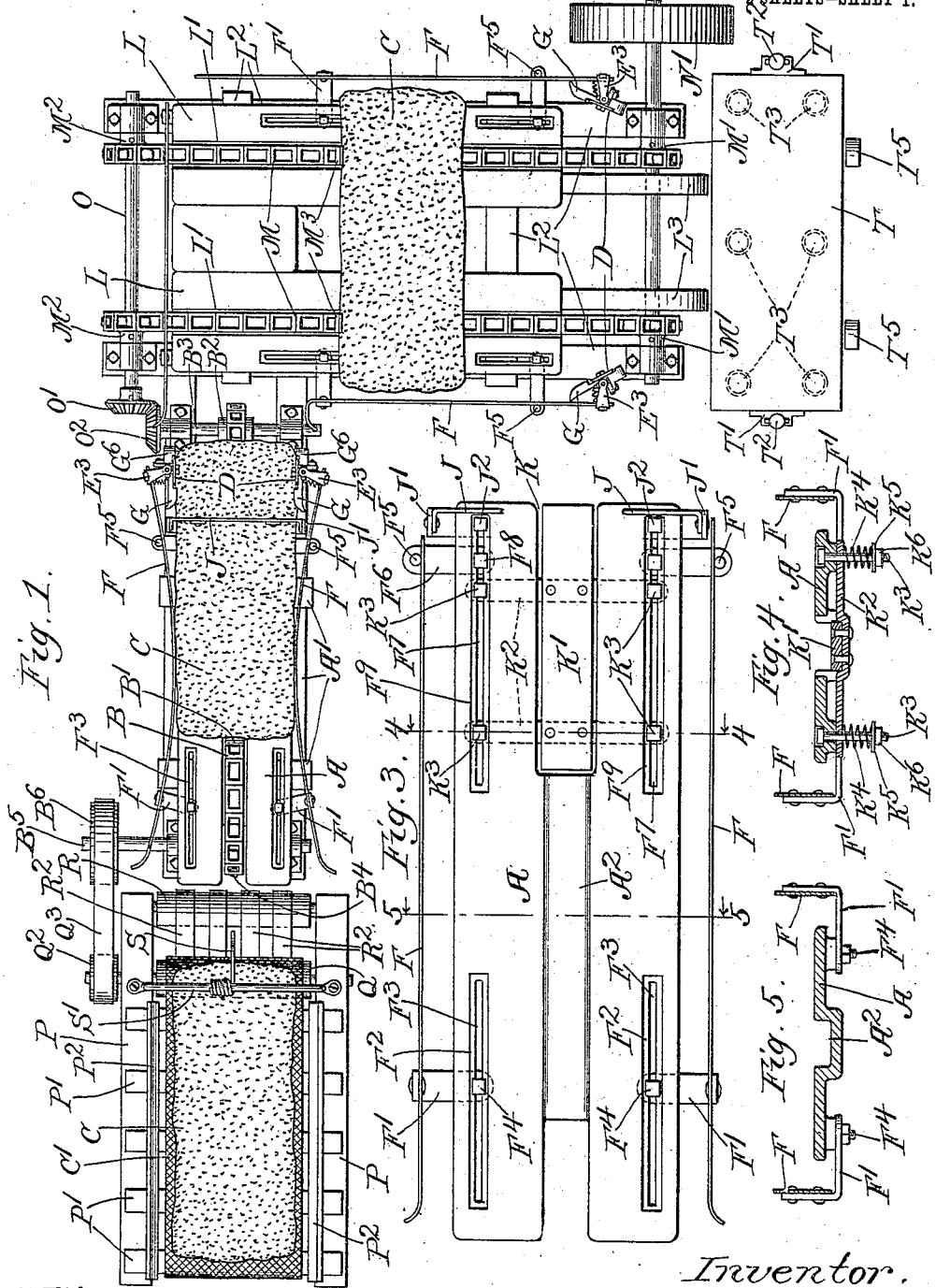
Witnesses.
Edward T. Wray
Percival H. Truman
Inventor.
John D. Belanger.
by Parker Carter
Attorneys.

No. 848,428. PATENTED MAR. 26, 1907.
J. D. BELANGER.
OIL CAKE TRIMMER.
APPLICATION FILED JUNE 2, 1906.
2 SHEETS—SHEET 2.
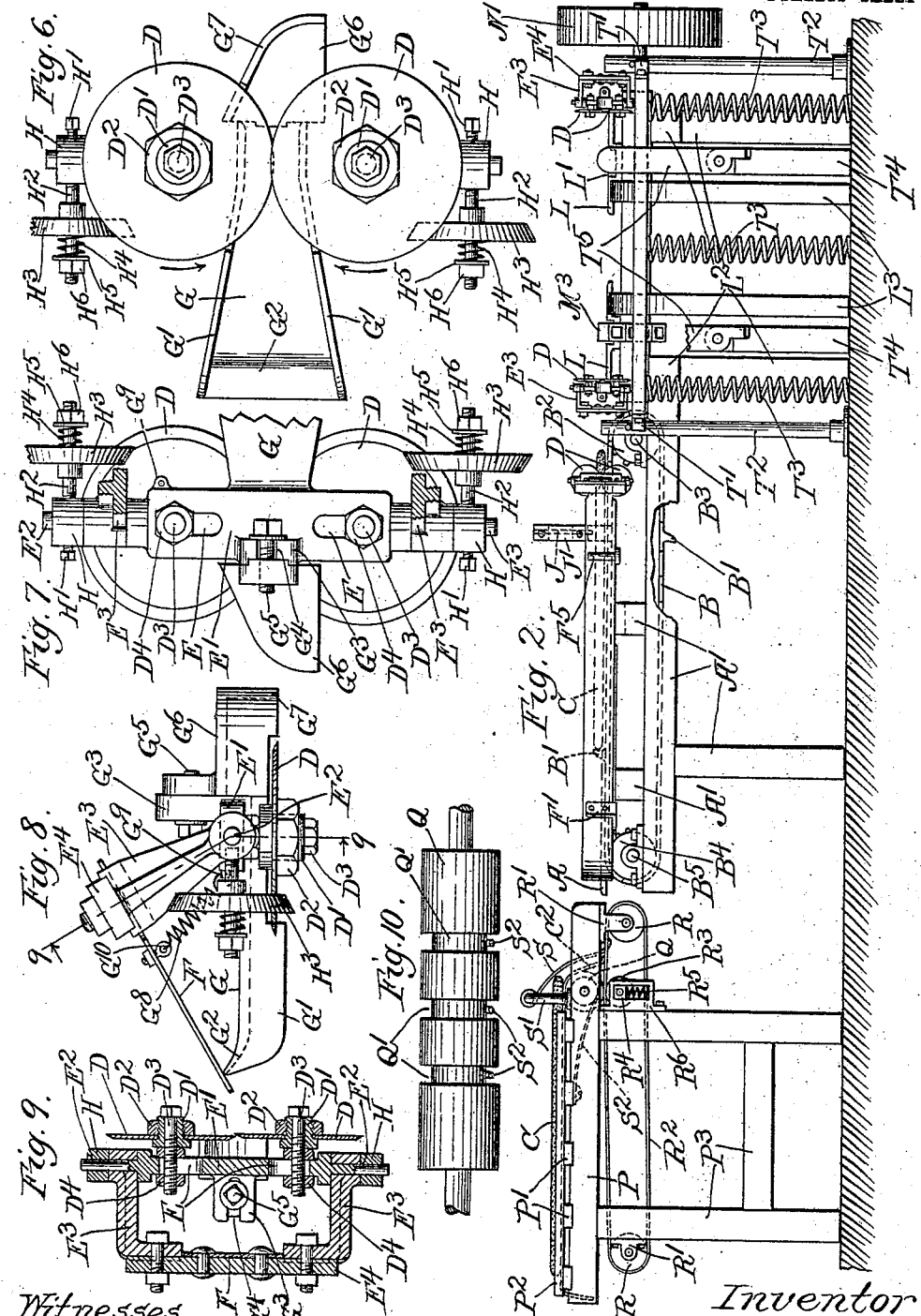
Witnesses.
Edward T. Wray.
Arival W. Truman
Inventor.
John D. Belanger
by Parker Carles
Attorneys.

UNITED STATES PATENT OFFICE.

JOHN D. BELANGER, OF CHICAGO, ILLINOIS.

OIL-CAKE TRIMMER.

No. 848,428.   Specification of Letters Patent.   Patented March 26, 1907.

Application filed June 2, 1906. Serial No. 319,837.

*To all whom it may concern:*

Be it known that I, JOHN D. BELANGER, a citizen of the United States, residing at Chicago, in the county of Cook and State of Illinois, have invented a certain new and useful Improvement in Oil-Cake Trimmers, of which the following is a specification.

My invention relates to apparatus for trimming oil-cake and similar substances, and has for its object to provide new and improved constructions in machines of that character.

In its present embodiment the invention contemplates an arrangement of tables, termed "primary" and "secondary" cutting-tables. The cakes are conveyed across first one and then the other of these tables in such a manner as to bring their edges into relation with suitably-arranged trimming or cutting devices. I have shown these tables arranged at right angles to each other, the sides of the cake being trimmed on the primary table and the ends on the secondary table. It will of course be obvious that the arrangement above indicated could be very materially changed.

The invention consists, more particularly, in providing new and improved cutting devices comprising flexibly-mounted cutters with which are associated means for holding the cake in proper relation to said cutters.

The invention consists, further, in improvements in the devices for feeding the cakes onto the primary tables and in stripping the cloth from the cakes.

The invention further consists in improvements in the devices for receiving the cakes from the secondary table and in such other new and improved devices as are set forth in the following specification.

The invention is illustrated in the accompanying drawings, wherein—

Figure 1 is a plan view; Fig. 2, a side elevation; Fig. 3, a detail plan of the primary table with parts broken away; Fig. 4, a section on line 4 4 of Fig. 3; Fig. 5, a section on line 5 5 of Fig. 3; Fig. 6, a detail elevation of one of the cutting devices; Fig. 7, a similar view of the cutter from the other side; Fig. 8, a plan view of the cutter; Fig. 9, a vertical section on line 9 9 of Fig. 8, and Fig. 10 a detail of one of the feeder-belt pulleys.

Like letters of reference indicate like parts in all the drawings.

The primary cutting-table consists of a metal plate A, supported upon a suitable framework $A'$ and provided with a central depression or channel $A^2$ for the endless conveyer B. This conveyer is preferably a link belt or chain of any ordinary type and is provided with hooks $B'$ $B'$, which abut against and push the cake across the table. The cake is indicated by the letter C, Fig. 1. The chain B runs over a sprocket-wheel $B^2$ on a shaft $B^3$, suitably journaled at one end of the table, and over a similar sprocket-wheel $B^4$ on a shaft $B^5$ at the other end of the table. The cutters are preferably located at the farther end of the table, one of such devices being located on each side. These cutters are mounted flexibly, so as to follow the hard part of the oil-cake, trimming off the soft oily mass at the edge of the cake. These cakes as they come from the press are often quite irregular in their shape, and, furthermore, the margin of soft material may vary very considerably in depth. It is the purpose of the machine of course to trim off all of the soft material without cutting into the hard part any more than is necessary. My invention contemplates an arrangement of the cutting apparatus by means of which the cake is held firmly against the cutters, but with such variable pressure that a perfect severance between the hard and soft part of the cake is effected.

The cutters are shown in detail in Figs. 6 to 9, inclusive, and in their position on the machine in Figs. 1 and 2. Preferably each cutter consists of two beveled disks D D, arranged one above the other. These disks are set on hubs $D'$ $D'$, being preferably held in position by the nuts $D^2$ $D^2$. The hubs turn on axles $D^3$ $D^3$, which are set, by means of pairs of set-nuts $D^4$, in slots E E in the vertical frame $E'$. This frame has the integral pins $E^2$ $E^2$ and is pivoted to the upper and lower brackets $E^3$, bolted to a block $E^4$. This block is riveted or otherwise secured to the end of a long spring F, secured at the other end on a bracket $F'$. The table has the channel $F^2$ with the longitudinal slot $F^3$, the bracket $F'$ being set at the proper place in the slot by means of the set-screw $F^4$, the head of which lies in the channel $F^2$, so as not to obstruct the travel of the cake. The bracket $F'$ is preferably loose on the set-screw $F^4$, so that it may be rocked slightly under the action of the spring, as shown in Fig. 1. The end of the spring carrying the cutter is stopped or braced by a pin $F^5$ on a bracket $F^6$, adapted to be set in the slot $F^7$, the head of the set-screw $F^8$ lying in a channel $F^9$, similar to the channel $F^2$ at the other end of the table. It will be understood that the same arrangement is preferably duplicated on the other side of the table, so that both sides of the cake may be trimmed at the same time.

The pivoted frame $E'$ is provided with the integral guide G, preferably flanged at $G'$ $G'$ and beveled at its mouth, as is shown at $G^2$. On the other side of the cutting-disks is an integral lug $G^3$, slotted at $G^4$ for the set-screw $G^5$ of the guide $G^6$ and having the downwardly-curved flange $G^7$. A light coiled spring $G^8$ extends from a lug $G^9$ on the pivoted frame $E'$ to an eyelet $G^{10}$ on the spring F, normally keeping the end of the guide G against the spring-piece F, as is shown in Fig. 8. When the cake reaches the cutting apparatus, it will rock the frame $E'$ to the position shown in Fig. 1, at the same time putting the spring-piece F under tension against the pin $F^5$. This will cause the spring-piece to bend or bow in at the center. The same thing happens, of course, at the other side of the cake, the result being that the cake is guided properly against the cutters so that they may automatically follow the line of separation between the hard and soft part of the cake. This action is wholly self-regulating.

I have also provided means for keeping the cutting-disks sharp. On the upper and lower pins $E^2$ are the collars H, rigidly set thereon by means of the set-screws $H'$ $H'$, these collars carrying the axles $H^2$ $H^2$, on which turn the emery or other suitable grinding wheels $H^3$ $H^3$, the beveled edges of which correspond with the bevels of the disks D. These wheels are yieldingly held against the disks by means of the springs $H^4$ $H^4$, interposed between the wheels and the washers $H^5$ $H^5$, held in position by the nuts $H^6$ $H^6$ on the ends of the axles.

The cakes, it is understood, are carried forward on the table A by means of the hooks $B'$ on the conveyer-chain B. As the cakes are not always fed with perfect regularity onto the table, I prefer to provide the stop or gate shown at J, Fig. 1, to prevent more than one cake reaching the cutters at a time. This gate or stop may be secured to the table by means of the brackets $J'$ $J'$, set in the farther ends of the slots $F^7$ by means of the set-screws $J^2$ $J^2$. It sometimes happens that one of the hooks $B'$ instead of lying behind the cake gets under it. This does no particular harm until the cake reaches the gate J. Here if a hook is under the cake the latter is likely to be broken. To obviate this difficulty, I prefer to provide a depressible runway for the chain at this end of the table. The table is therefore bifurcated by the slot K, and in this slot is the platform $K'$, supported on the transverse arms $K^2$ $K^2$, which are guided on the bolts $K^3$, these transverse arms being supported by coiled springs $K^4$ $K^4$, surrounding the bolts $K^3$ and interposed between the ends of the arms $K^2$ and the washers $K^5$, held on the ends of the bolt $K^3$ by the nuts $K^6$. Normally the springs hold the runway in alinement with the bottom of the channel $A^2$; but when one of the hooks $B^2$ lies under the cake the platform K will sink, and with it the conveyer-chain and the hook. The hook will therefore be moved beyond the cake and the next hook brought up in its proper position against the end of the cake.

The cake passes from the primary table A to a secondary table, where the ends are trimmed. This table is similar in construction to the primary table, but has to be wider. It preferably consists of two metal plates L L, provided with the channels $L'$ for the conveyer-chains M M. The chains are provided with the hooks $M^3$ $M^3$, similar to the hooks on the chain B. The plates L L are suitably supported on a framework $L^2$. From the forward end of the plates L extend the strips $L^3$ $L^3$, which are preferably curved over and brought down to the floor, as shown in Fig. 2. I may use any kind of cutting or trimming device on this table, to be mounted either flexibly or rigidly. I have shown, however, and prefer to use the flexibly-mounted double-action cutters used on the primary cutting-table. The description of this apparatus is the same as that of the primary cutters and need not be repeated. The chains M M run over sprockets $M'$ $M'$ on the shaft N, suitably journaled on the framework $L^2$, and over similar sprockets $M^2$ $M^2$ on the shaft O. The shaft N is provided with the driving-pulley $N'$ and the shaft O with the bevel-gear $O'$, which meshes with a bevel-gear $O^2$ on the forward shaft $B^3$ of the primary cutting-table. I also preferably provide means for feeding the cakes onto the primary cutting-table and for receiving the trimmed cakes as they come from the secondary cutting-table. With the former apparatus is associated improved means for stripping off the cloth which ordinarily covers one side of the oil-cake when it comes from the press.

The feeding and stripping apparatus is shown at the left-hand side of Figs. 1 and 2. It consists of a table comprising the longitudinal pieces P and the cross-pieces $P'$ $P'$, together with the guide-rails $P^2$ $P^2$, this structure being supported on a framework $P^3$. The cake C is deposited on this table with the cloth $C'$ on the under side. At the forward end of the table is a roller Q, provided with the grooves $Q'$, a detail of this roller being shown in Fig. 10. The roller is journaled on the side pieces P and is provided with a driving-pulley Q², connected by a belt Q³ with a pulley B⁶ on the shaft B⁵. Beneath the table are the rollers R R, journaled in the brackets R' R'. Endless belts R² run over these rollers, these belts being driven by the roller Q, beneath which is placed a roller R³, journaled in blocks R⁴, under tension of the springs R⁵, located in the boxes R⁶. The cloth ordinarily extends somewhat beyond the end of the oil-cake. The cloth of the front end, as shown at C², will fall down upon the belts R², so as to be carried backward between the rollers Q and R³. These rollers will strip the cloth from the cake and at the same time carry the cake forward onto the primary cutting-table. In order to insure this, I preferably provide a spring-finger S, which extends from a stanchion S', located above the cake, this finger preferably extending near to or between the belts R². In order to prevent the cloth from winding about the roller Q, I provide a number of spring-fingers S², which are secured to one of the cross-pieces P' and extend into the slots Q' in the roller Q.

I will lastly describe the apparatus for receiving the trimmed cake when it leaves the secondary cutting-table. This apparatus consists of a receiving-table T, provided at each end with grooved castings T' T', which guide the table on the upright standards T² T². The table is supported by a plurality of coiled springs T³. At the farther side of the table are stops to prevent the cake from being pushed off the table. These stops consist of the stationary uprights T⁴ T⁴, to which are secured the hinged extensions T⁵ T⁵. The table will of course be depressed by the weight of the cakes. When desired, the extension-pieces T⁵ may be turned over and the cakes unloaded.

I wish it to be understood that I do not desire to be limited to the exact details of construction shown and described, for obvious modifications will occur to any person skilled in the art.

The use and operation of my device will perhaps have been made sufficiently clear by the foregoing. I will, however, recapitulate.

The cake is first deposited upon the feeding and stripping table, where it is forwarded to the primary table and at the same time is stripped of the cloth which covers the under side. The forward movement of the cake is continued through the agency of the chain B, which conveys the cake under the gate J and against the cutting-disks D. The cutters are pivotally and yieldingly mounted so as to follow with precision the line of the hard portion of the cake, trimming off the soft oily margin. The cutters on either side are independent one of another, but coact in holding the cake in proper position to be cut. The spring-mounting of the cutters serves not only to permit the cutters to penetrate more or less deeply into the cake, but also to adjust and hold the cake in the most effective position with regard to the cutters. This double action of the elastic element of the cutting apparatus results in a very effective machine. From the primary table the cake passes to the secondary table, where it is carried forward by the two chains M M against the cutting devices here provided. The cake then is carried over the strips L³ L³ and deposited on the table T.

I claim—

1. In a machine for trimming oil-cake, the combination of a spring-arm with a cutting device pivotally mounted upon said arm, and a spring connected with said cutting device and adapted to be put under tension when the same is turned on its pivot.

2. In a machine for trimming oil-cake, the combination of a cutting-table, an elastic guiding-piece associated with said table, and a movable cutter on the table adapted to force the elastic guiding-piece into contact with the cake.

3. In a machine for trimming oil-cake, the combination of a cutting-table, elastic guiding-pieces associated with said table, and movable cutters on the table adapted to force the elastic guiding-pieces into contact with the cake.

4. In a machine for trimming oil-cake, the combination of means for supporting and moving the cake, a movable cutter, and a longitudinally-placed spring associated with the cutter and adapted to be put under tension by the cutter against the cake to guide the cake in its travel.

5. In a machine for trimming oil-cake, the combination of means for supporting and moving the cake, a movable cutter, and a longitudinally-placed spring on which the cutter is mounted and adapted to be put under tension against the cake to guide the cake in its travel.

6. In a machine for trimming oil-cake, the combination of means for supporting and moving the cake, a flexible arm lying along the travel of the cake, and a cutter pivoted on the flexible arm, said flexible arm consisting of a long strip which lies along the side of the cake and parallel therewith and which responds to the inequalities in the edge of such cake for the purposes specified.

7. In a machine for trimming oil-cake, the combination of a cutting-table, means for conveying the cake across said table, a flexible arm connected with the table at one side of the cake, and a cutter mounted on said flexible arm, said flexible arm consisting of a long strip which lies along the side of the cake and parallel therewith and which responds to the inequalities in the edge of such cake for the purposes specified.

8. In a machine for trimming oil-cake, the combination of a cutting-table, means for conveying the cake across said table, a flexible arm connected with the table at one side of the cake, and a cutter mounted on said flexible arm, said flexible arm consisting of a long strip which lies along the side of the cake and parallel therewith and which responds to the inequalities in the edge of such cake for the purposes specified.

9. In a machine for trimming oil-cake, the combination of a table, with means for moving the cake across the table, a flexible arm secured at one end to the table, a cutter associated with the other end of the flexible arm, and an engaging device against which the flexible arm is put under tension when the cutter is moved.

10. In a machine for trimming oil-cake, the combination of a flat flexible arm, means for limiting the movement of a portion of the flexible arm, and a pivoted cutter mounted on the free end of the flexible arm, said flexible arm consisting of a long strip which lies along the side of the cake and parallel therewith and which responds to the inequalities in the edge of such cake for the purposes specified.

11. In a machine for trimming oil-cake, the combination of means for supporting and moving the cake, and a cutter against which the cake is carried, comprising coacting circular cutting-blades.

12. In a machine for trimming oil-cake, the combination of means for supporting and moving the cake, and a yieldingly-mounted cutter against which the cake is carried, comprising coacting circular cutting-blades.

13. In a machine for trimming oil-cake, the combination of means for supporting, and moving the cake and a yieldingly-mounted pivoted cutter against which the cake is carried, comprising coacting circular cutting-blades.

14. In a machine for trimming oil-cake, a cutter comprising a rocking frame, upper and lower cutting-blades on said frame, and a guide to receive the edge of the cake.

15. In a machine for trimming oil-cake, a cutter comprising a rocking frame, upper and lower cutting-disks on said frame, and a guide to receive the edge of the cake.

16. In a machine for trimming oil-cake, a cutter comprising a rocking frame, upper and lower cutting-disks on said frame, a guide to receive the edge of the cake, and means for yieldingly mounting the frame.

17. In a machine for trimming oil-cake, a cutter comprising a rocking frame, upper and lower cutting-disks on said frame, a guide to receive the edge of the cake, and a spring on which the cutter is mounted.

18. In a machine for trimming oil-cake, a cutter comprising a rocking frame, upper and lower cutting disks on said frame, a guide to receive the edge of the cake, a spring on which the cutter is mounted, and an elastic device to normally hold the blades oblique to the direction of travel of the cake.

19. In a machine for trimming oil-cake, the combination of a cutting-table, with a conveyer-chain, and a runway in the table for the chain, a portion of such runway being depressible.

20. In a machine for trimming oil-cake, the combination of a cutting-table, with a conveyer-chain, a runway in the table for the chain, a portion of such runway being depressible, and a gate over the table.

21. In a machine for trimming oil-cake, a feeder and stripper comprising stripping-rolls to engage the cloth on the cake, and means for carrying the end of said cloth between the rolls.

22. In a machine for trimming oil-cake, a feeder and stripper comprising stripping-rolls to engage the cloth on the cake, means for carrying the end of said cloth between the rolls, and means for preventing the cloth from winding around said rolls.

23. In a machine for trimming oil-cake, a feeder and stripper comprising stripping-rolls to engage the cloth on the cake, means for carrying the end of said cloth between the rolls, one of said rolls being grooved, and fingers lying in said grooves.

24. In a machine for trimming oil-cake, the combination of a feed-table, stripping-rolls associated with said table, a conveyer for the cloth, and a finger to press the end of the cloth onto the conveyer.

25. In a machine for trimming oil-cake, the combination of a receiving-table comprising a movable receiving part and an elastic support on which the same is mounted, with a stop at the back of the table pivoted to a stationary part of the table substantially as and for the purpose described.

26. In a machine for trimming oil-cake, the combination of a flexible arm fastened at one end and free at the other, with a cutting device mounted on the free end of said arm, said flexible arm consisting of a long strip which lies along the side of the cake and parallel therewith and which responds to the inequalities in the edge of such cake for the purposes specified.

27. In a machine for trimming oil-cake, the combination of a flexible arm fastened at one end and free at the other, with a cutting device pivotally mounted on the free end of said arm, said flexible arm consisting of a long strip which lies along the side of the cake and parallel therewith and which responds to the inequalities in the edge of such cake for the purposes specified.

28. In a machine for trimming oil-cake, the combination of means for supporting and moving the cake, with a cutter against which the cake is carried comprising a vertical circular rotatable cutting-blade.

29. In a machine for trimming oil-cake, the combination of a rotatable circular cutting-blade against which the cake is carried, with a grinding-wheel arranged so as to be constantly in contact with the edge of the cutting-blade, and a spring to maintain the contact between the wheel and the cutting-blade.

JOHN D. BELANGER.

Witnesses:
    PERCIVAL A. TRUMAN,
    LUCY A. FALKENBERG.